US008345850B2

(12) United States Patent
Hodge

(10) Patent No.: US 8,345,850 B2
(45) Date of Patent: *Jan. 1, 2013

(54) SYSTEM AND METHOD FOR DETECTING THREE-WAY CALL ATTEMPTS

(75) Inventor: Stephen L. Hodge, Aubry, TX (US)

(73) Assignee: Value-Added Communications, Mobile, AL (US)

(*) Notice: Subject to any disclaimer, the term of this patent is extended or adjusted under 35 U.S.C. 154(b) by 137 days.

This patent is subject to a terminal disclaimer.

(21) Appl. No.: 12/655,304

(22) Filed: Dec. 28, 2009

(65) Prior Publication Data

US 2010/0177881 A1 Jul. 15, 2010

Related U.S. Application Data

(63) Continuation of application No. 10/851,675, filed on May 21, 2004, now Pat. No. 7,639,791.

(51) Int. Cl.
*H04M 3/42* (2006.01)
(52) U.S. Cl. ............... 379/207.01; 379/106.08; 379/377
(58) Field of Classification Search ............ 379/207.01, 379/106.08, 377, 201.01; 348/14.09; 370/521
See application file for complete search history.

(56) References Cited

U.S. PATENT DOCUMENTS

| 5,319,702 A | 6/1994 | Kitchin et al. |
| 5,539,812 A | 7/1996 | Kitchin et al. |
| 5,583,925 A | 12/1996 | Bernstein |
| 5,619,561 A | 4/1997 | Reese |
| 5,745,558 A | 4/1998 | Richardson, Jr. et al. |
| 5,768,355 A | 6/1998 | Salibrici et al. |
| 5,796,811 A | 8/1998 | McFarlen |
| 5,805,685 A | 9/1998 | McFarlen |
| 5,883,945 A | 3/1999 | Richardson et al. |
| 5,926,533 A | 7/1999 | Gainsboro |
| 5,953,049 A * | 9/1999 | Horn et al. ............... 348/14.09 |
| 6,141,406 A | 10/2000 | Johnson |
| 6,389,293 B1 | 5/2002 | Clore et al. |
| 6,671,292 B1 * | 12/2003 | Haartsen ............... 370/521 |
| 6,763,099 B1 | 7/2004 | Blink |
| 7,050,918 B2 | 5/2006 | Pupalaikis et al. |
| 7,079,637 B1 | 7/2006 | McNitt et al. |

* cited by examiner

*Primary Examiner* — Thjuan K Addy

(74) *Attorney, Agent, or Firm* — Sterne, Kessler, Goldstein & Fox P.L.L.C.

(57) ABSTRACT

Embodiments of this disclosure include methods in which a three-way call attempt is detected. Methods include monitoring the active communications of a telephone management system for pulses of energy indicative of a three-way call. A Fast Fourier Transform (FFT) is computed for each pulse of energy with time domain characteristics consistent with a click. Phases of each component for the pulse are also analyzed. If the phases are generally linear (i.e., if the phases have a common group delay or phase delay), then the pulse is a three-way call click and appropriate action (e.g., monitoring the call, terminating the call, warning the caller, etc.) is initiated.

18 Claims, 7 Drawing Sheets

SYSTEM AND METHOD FOR DETECTING THREE-WAY CALL ATTEMPTS

CROSS-REFERENCE TO RELATED APPLICATIONS

This application is a continuation of U.S. patent application Ser. No. 10/851,675, filed May 21, 2004, now U.S. Pat. No. 7,639,791, which is incorporated by reference herein in its entirety.

FIELD OF THE INVENTION

The present invention relates generally to the field of detecting three-way call attempts in controlled telecommunications systems. In particular, the invention relates to a system and method for detecting a pulse of energy having components with a common phase delay. According to the present invention, a pulse with this characteristic is indicative of a three-way call attempt. The present invention preferably computes the Fast Fourier Transform (FFT) to calculate the phases of the components that comprise the pulse.

BACKGROUND OF THE INVENTION

Many institutions, such as prisons, nursing homes, mental institutions, etc., include controlled telecommunications systems that offer inmates or residents limited calling access. One reason for controlling use of the system is to prevent the institution from incurring unaccountable telephone costs. Other reasons for controlling access to the system include preventing harassing calls to outside parties, preventing fraudulent activities, etc. Therefore, systems in such environments often monitor and control the telephone activity of each inmate or resident. For example, systems may restrict calling to only certain telephone numbers. Systems may also have a means of maintaining call records for each inmate or resident, and a means for communicating with called parties to enable the called parties to prevent future telephone calls from inmates or residents. In short, the communications system used in a regulated institution must employ unique monitoring and control functions often unnecessary in other types of telecommunications systems.

In order for the methods of monitoring and control to be effective, it is important to prevent inmates or residents from exploiting any loop-holes that can be used to bypass the control features of the system. For example, inmates or residents have been known to use three-way calling to have an outside party connect the inmate or resident to a blocked number. A three-way call is initiated when the remote called party depresses the hook switch on the telephone, generating a hook flash signal. The caller is temporarily put on hold while the called party establishes a connection with a third party. Then, all three parties can converse. Using three-way calling, the inmate or resident may utilize the institution's call system to, among other things, access blocked telephone numbers, for example, to perpetrate additional criminal activities, or harass certain parties.

It is therefore critical to carefully monitor all outgoing telephone calls for three-way call attempts. Without such monitoring, many of the system's control features of a telecommunications system can be rendered ineffective. Currently, there are systems and methods known in the art for detecting three-way call attempts. Many of these systems however, are inaccurate and subject to both false positives and false negatives. In addition, many of these systems are effective only in certain types of telecommunications systems.

For example, one such system known in the art for detecting three-way call attempts monitors for pulses of energy indicative of a hook-flash by detecting the frequency of the energy pulse to determine if it is characteristic of a hook-flash (i.e., a three-way call attempt). Specifically, the system includes a low pass filter for passing energy signals having frequencies below 500 Hertz ("Hz"), preferably in the range of 100 to 300 Hz, and an energy detector for detecting specific electrical energy pulses passing through the filter and having a predetermined minimum magnitude. The system also includes a software window analyzer, which cooperates with the energy detector to detect specific events, such as sound, occurring on the telephone line during a predetermined time window after the detection of the aforementioned energy pulse. The software window analyzer includes a timer means that is activated by the detection of the energy pulse, and a sound means for detecting the occurrence of sound on the telephone line during at least one of multiple windows of time defined by the timer means. The non-occurrence of sound on the telephone line during a specified time window is used by the system to confirm that the detected energy pulse is in fact a three-way call attempt. A counter means is further implemented for counting specific energy pulses detected by the energy detector during the time window when the remote party is using a pulse-dial telephone. This system, by simply monitoring for a pulse composed of certain frequencies, is often inaccurate and cannot operate in digital systems.

A similar system is also designed to detect the presence of an energy pulse indicative of a hook-flash. Specifically, the system is designed to detect a pulse that is comprised of frequency components below 500 Hz and above a predetermined threshold. The existence of the hook-flash is confirmed by digital signal processing equipment which identifies a rapid drop-off in energy, which is indicative of a hook-flash signal. Optionally, the hook-flash may be further confirmed by including software for cooperating with the energy detector to ascertain whether sound has occurred in the telecommunication during a predetermined period following the first hook-flash signal.

Still another known system includes three-way call detection circuit that uses digital signal processing to identify a third party connection. The system operates by establishing a baseline background noise. The system identifies a drop in noise level below the established baseline background noise as an indication that a three-way conference call has been attempted by the called and/or calling party.

Yet another known system monitors all connected telephone lines for indicia representative of a three-way call attempt. For example, the system may monitor for a digital PCM signal or a period of silence, followed by a release pulse, followed by yet another period of silence. Upon detection of a possible three-way call attempt, the three-way call detection circuit examines the digital signals to determine the spectral characteristics (i.e., time duration, frequency, and energy level) of a suspected release pulse of the suspected three-way call attempt. The system utilizes pattern recognition techniques to compare the suspected release pulse with a reference release pulse indicative of a three-way call attempt. The system also monitors for periods of silence before and after the suspected release pulse. If the system finds that the suspected release pulse is substantially similar to the reference release pulse and that the correct periods of silence surrounding the suspected release pulse are present, the system responds to the detection, for example, by disconnecting the telephone call, playing a recording, or creating a record of the three-way call attempt.

Yet another known system for detecting three-way calls monitors audio signals for features that distinguish voice and line-generated audio signals from audio signals produced by events associated with three-way call attempts. The distinguishing features used are pulse patterns that are strongly correlated with either audio signals generated by central office switching activity ("clicks") (reference features) or voice-generated audio signals (reset features). Audio signals are continuously monitored for reference and reset features over selected intervals or sampling windows. Sampling windows are reset whenever reset features are detected in the associated audio signal segment. Audio signals that are free of reset features and include reference features are tagged as potential click events. A three-way call event is declared when audio signals associated with consecutive sample windows are tagged as potential three-way call events. In this system, a control program samples the audio signal at the selected rate and sorts the sampled signals during a sampling window to produce a profile of the sampled audio signal. The profile comprises counters for tracking the number, strength (loudness), and separation of signal pulses. These counters may be compared in various combinations with counter values extracted from voice-generated audio signals (reset thresholds) and three-way call generated audio signals (reference thresholds) to declare a three-way call attempt, continue sampling, or reset the sampling window.

Another known system counts signal characteristics to detect three-way call attempts. The system samples audio from a telephone conversation, sorts the sampled signals into a profile of levels for the sampled audio signals, and monitors the profile of sampled audio signals for reset and reference conditions. In this system a reset condition is a pulse pattern inconsistent with patterns generated by three-way call events. Reference conditions, in contrast, are pulse patterns identified from sampled audio signals that are consistent with patterns generated by three-way call events. If a reference condition is detected, the telephone call is tagged as having a possible three-way call attempt. The system concludes that a three-way call attempt has occurred when two consecutive tags have been made to the same telephone call.

Still another known system detects three-way calls by recognizing that each telephone connection has a characteristic reflection, or echo, idiosyncratic to that connection. The echo characteristics of a particular telephone connection are altered, for example, when a three-way calling feature is activated by the remote party at the original destination thereby adding a third party at a secondary destination. The system includes means for "zeroing out" or canceling the characteristic echo once a connection has been established by using an adaptive finite impulse response (FIR) filter. The system also includes response means for implementing a predetermined response when an undesirable event is detected. Examples of the responses which can be pre-programmed include call termination, playing a prerecorded message, generating a tone which may be heard by one or more parties to the call, muting the microphone of the local telephone and recording the date and time of the remote party's attempt to initiate the three-way call.

Other systems are known which incorporate methods of monitoring calls in telecommunications management systems. For example, the methods include means for detecting tones commonly associated with call bridging and call forwarding attempts. One such method is directed to the detection of tones such as ring signals, busy signals, special information tones ("SIT tones"), dual tone multi-frequency tones ("DTMF"), call progress tones or other similar tones characteristic of the placement of a telephone call.

In view of the foregoing, a need clearly exists for an improved method and system of three-way call detection capable of more accurately detecting three-way call attempts in analog and digital telecommunications systems. Existing methods and systems are exceedingly inaccurate resulting in far too many false positive and false negative detections. The three-way call detection system of the invention detects three-way call attempts by analyzing the communications path between the originator and recipient in a telecommunications network. The system is more accurate than existing systems and searches for pulses having characteristics consistent with a three-way call without the need to detect the frequency of an energy pulse.

SUMMARY OF THE INVENTION

The present invention embodies three-way call detection circuit for use with an existing telephone management system, and is designed to reduce the number of three-way call attempts not detected by current three-way call detection techniques as well as eliminate or significantly reduce the number of false three-way calls detected. The system of the present invention may be implemented in a variety of facilities including, but not limited to, penal institutions, mental institutions, nursing homes, rehabilitation centers, correctional facilities, government agencies, private and public business, and the like.

Typically, a telephone management system used by such facilities consists of a multitude of telephones connected to a switchboard device. The switchboard device routes calls, performs voice prompts, and responds to menu selections. Telephone calls placed by users of the telephone management system are routed through the switchboard device and connected to the proper outgoing trunk based on the type of call placed (e.g., collect, debit, etc.). An integrated cross point switch enables any telephone to access any available outgoing trunk.

The three-way call detection circuit of the present invention is utilized each time a telephone call is placed by a user of the telephone management system. The circuit constantly monitors all active trunk lines and telephone conversations. During a telephone call, the three-way call detection circuit monitors the connection for pulses of energy associated with the act of the called party initiating a three-way call. Specifically, the system of the present invention monitors for the presence of audio signals generated by central office switching activity (hereinafter, "clicks") indicative of a three-way call initiation attempts.

For a called party to initiate a three-way call, the called party typically depresses the hook-switch momentarily to put the calling party on hold and to call a third-party. The called party's depression of the hook-switch generates a hook-flash signal, which results in the central office generating a click on the inmate's telephone line. The click is most generally a pulse of energy with certain known characteristics. Therefore, by monitoring for pulses of energy with characteristics consistent with a click, three-way calls can be identified. An appropriate response (terminating the telephone call, monitoring the telephone call, warning the called party, etc.) can then be initiated. As discussed above, there are several known methods and systems for determining if a three-way call attempt has been made.

The present invention provides an improved method of monitoring for such a click. According to the present invention, a pulse is a click indicative of a three-way call attempt if the phases of the frequency components that comprise the pulse have a common group delay (i.e., each component has the same, or approximately the same phase delay). A click is comprised of many components all of which are generated at nearly the same instant in time. Thus, in accordance with the present invention, any of the components that comprise the pulse can be analyzed to determine if the pulse is indicative of a three-way call click (i.e., the invention does not require the filtering or analysis of one specific band or range of frequencies).

To analyze a pulse that may be indicative of a three-way call, the FFT is applied to the pulse to convert it into the frequency domain. As is known in the art, the FFT is a computationally efficient mathematical technique that converts digital information from the time domain to the frequency domain for rapid spectral analysis. Specifically, the FFT is an algorithmic optimization of the discrete Fourier transform ("DFT") (i.e., the FFT produces the same results as the DFT but using far fewer computations). Therefore, although the DFT is discussed by way of background below, this discussion applies equally to the FFT.

The DFT breaks down a digital signal into its frequency components (i.e., into a summation of harmonically-related cosine and sine waves). For a discrete (i.e., digital) signal, x[t], with N samples, the DFT is defined as:

$$X[w_k] = \sum_{n=0}^{N-1} x[t_n] e^{-jw_k t_n}, k = 0, 1, 2, \ldots, N-1 \quad (1)$$

In this equation (1), $x[t_n]$ is the signal in the time domain, $t_n$ is the $n_{th}$ sampling instant, $W_k$ is the $k_{th}$ frequency sample (i.e., the $k_{th}$ frequency component), and $X[w_k]$ is the DFT of the signal. The DFT computes a complex coefficient for each frequency component that comprises the signal. As is known in the art, $e^{-jw_k t_n}$ can be broken down into a cosine and sine component (i.e., $e^{-jw_k t_n} = \cos(w_k t_n) + j \sin(w_k t_n)$). Therefore, the complex coefficient is a representation of a cosine and sine wave (each with frequency $w_k$) that comprise the kth frequency component of the signal. The real component of the complex coefficient is the magnitude of the cosine wave, and the imaginary component of the complex coefficient is the magnitude of the sine wave.

The complex coefficient can also be used to calculate the overall magnitude and phase of the corresponding component. Specifically, the magnitude (or amplitude) of the component is the square root of the sum of the squares of the real and imaginary components of the corresponding coefficient:

$$\text{Magnitude} = \sqrt{\text{Real}^2 + \text{Imaginary}^2} \quad (2)$$

The phase is the arctangent of the imaginary component divided by the real component:

$$\text{Phase} = a\tan(\text{Imaginary}/\text{Real}) \quad (3)$$

Therefore, a cosine wave corresponds to a wave with 0 degrees phase (0 radians) and a sine with corresponds to a wave with 90 degrees phase ($\pi/2$ radians). The range of possible phase values that can be computed by the FFT extends from −180 degrees (−π radians) to 180 degrees (π radians).

In sum, using the mathematical properties of the DFT (or the FFT), the magnitude and phase for each component that comprises a digital signal can be developed. In the system of the present invention, the FFT is used to calculate the phases of the components that comprise the pulse.

After the phases are calculated for each of the frequency components that comprise a pulse, the phase data is analyzed to determine if the pulse is a click indicative of a three-way call attempt. As is known in the art, if a called party attempts to initiate a three-way call, central office switching activity (i.e., a three-way call click) is generated on the telephone line of the calling party. This click, or pulse of energy, is comprised of many components. Importantly, because the waves (i.e., the frequency components that comprise the pulse) are created at close to the same instant in time, the phase delay for each of the components that comprise the pulse should be approximately the same. As will be discussed below, the phase delay can be calculated from the phase, and is constant across all components of the pulse if phase varies linearly as a function of frequency.

First, the phases computed by the FFT are preferably "unwrapped" (i.e., converted from a range of −π to π to a larger range to smooth out artifacts that result from the FFT calculation). The phase should be unwrapped because, although the FFT calculates a phase for each component, the sinusoidal nature of the output of the FFT results in a calculated phase that ranges from −π to π. If the real phase extends beyond this range, large jumps in phase may appear to exist between components when the calculated phrase "wraps around" the −π to π range. Therefore, phase unwrapping operates to correct these phase jumping artifacts by adding multiples of +/−2π when absolute jumps between consecutive phases are greater than a predefined tolerance (e.g., π). The resulting unwrapped phases are thus smoother and devoid of artificial jumps.

After the phase is unwrapped, it is analyzed for linearity. As discussed above, and as will be developed below, if phase varies linearly as a function of frequency, the phase delay is constant. Phase is in a unit of radians. However, the system of the present invention is used to locate pulses of energy where each component has the same "phase delay", which is in unit time. Specifically, phase delay, $P(\omega)$, is defined as:

$$P(\omega) = \Theta(\omega)/\omega, \quad (4)$$

where $\Theta(\omega)$ is the phase, or unwrapped phase, in radians of the component of the signal having frequency $\omega$.

As mentioned above, a click is generated by the central office and is composed of many frequency components. Because it is a "machine generated" pulse, all of the components are generated at the same time and should therefore have a common phase delay. Thus, according to the present invention, if the phase delay of each component of a pulse is the same, then the pulse is indicative of a three-way call click.

If the phase delay is constant for each component, then phase varies linearly as a function of frequency. Therefore, as an alternative to computing the phase delay, the linearity of the phases, or unwrapped phases, can be calculated. If the phase is linear with respect to frequency (i.e., $\Theta(\omega) = \alpha(\omega)$, where $\alpha$ is a constant), then through simple substitution, it is evident that the phase delay will be the same ($\alpha$), independent of $\omega$. For example:

$$P(\omega) = \alpha^* \omega/\omega, \text{ and} \quad (5)$$

$$P(\omega) = \alpha. \quad (6)$$

In the art of signal analysis, computing a "group delay", $G(\omega)$ can be used to determine the linearity of the phase. More specifically, the group delay is defined as the derivative of the phase as a function of frequency:

$$G(\omega) = -d/d\omega(\Theta(\omega)). \quad (7)$$

Thus, if phase is linear, the group delay will be a constant.

If the derivative is a constant (i.e., $\Theta(\omega)$) is linear with respect to frequency), then the group delay equals the phase delay (i.e., α) and thus the phase is indicative of a three-way call click. Appropriate action can then be taken (e.g., disconnecting the call, warning the caller, logging or recording the call, etc.).

In a preferred embodiment, the system isolates only those pulses with time-domain characteristics that are consistent with a click, thus obviating the need to perform the computationally intensive FFT on all pulses. More specifically, the system preferably searches for only those pulses of energy that (1) are at most 40 milliseconds (ms) in length and that (2) are followed and preceded by a period of silence (POS). The POS that precedes the pulse must be at least approximately 100 ms in length. The POS that follows the pulse also must be at least approximately 100 ms. Of course, the time requirements can be adjusted for the specific telecommunications system in which the three-way call detect circuit is implemented.

If a pulse is having these characteristics is detected, then the FFT of the pulse signal is calculated, and the phase is analyzed as discussed above. Of course, the system may be used with other filters and three-way call detect methods to further increase accuracy.

Therefore, it is an object of the present invention to provide a three-way call detection method and circuit for analyzing the telephone line of a calling party for pulses of energy having phase characteristics indicative of a three-way call click.

It is another object of the invention to provide a three-way call detection method and circuit for analyzing the telephone line of a calling party for pulses of energy comprised of frequency components having similar or identical phase delays.

It is still another object of the invention to provide a three-way call detection method and circuit for analyzing the telephone line of a calling party for pulses of energy indicative of a three-way call attempt by computing the FFT of the pulses.

It is yet another object of the invention to provide a three-way call detection method and circuit for analyzing the telephone line of a calling party for pulses of energy with time domain characteristics consistent with a three-way call click.

It is a further object of the invention to provide a three-way call detection method and circuit that is not restricted to analyzing a certain band or range of frequencies.

Furthermore, it is an object of the invention to accurately detect three-way call attempts and respond with a designated action (e.g., disconnect, flag, record, monitor, etc.).

It is another object of the invention to provide a three-way call detection method and circuit which stores all detected three-way call attempts in a central database.

It is still a further object of the invention to provide a three-way call detection method and circuit capable of monitoring a telephone conversation from the called party's side of the connection.

Additionally, it is an object of the invention to provide a three-way call detection method and circuit which is compatible with pre-existing telephone management systems.

Finally, it is a further object of the invention to provide a three-way call detection method and circuit compatible with both analog and digital telecommunications systems.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Figure 1:
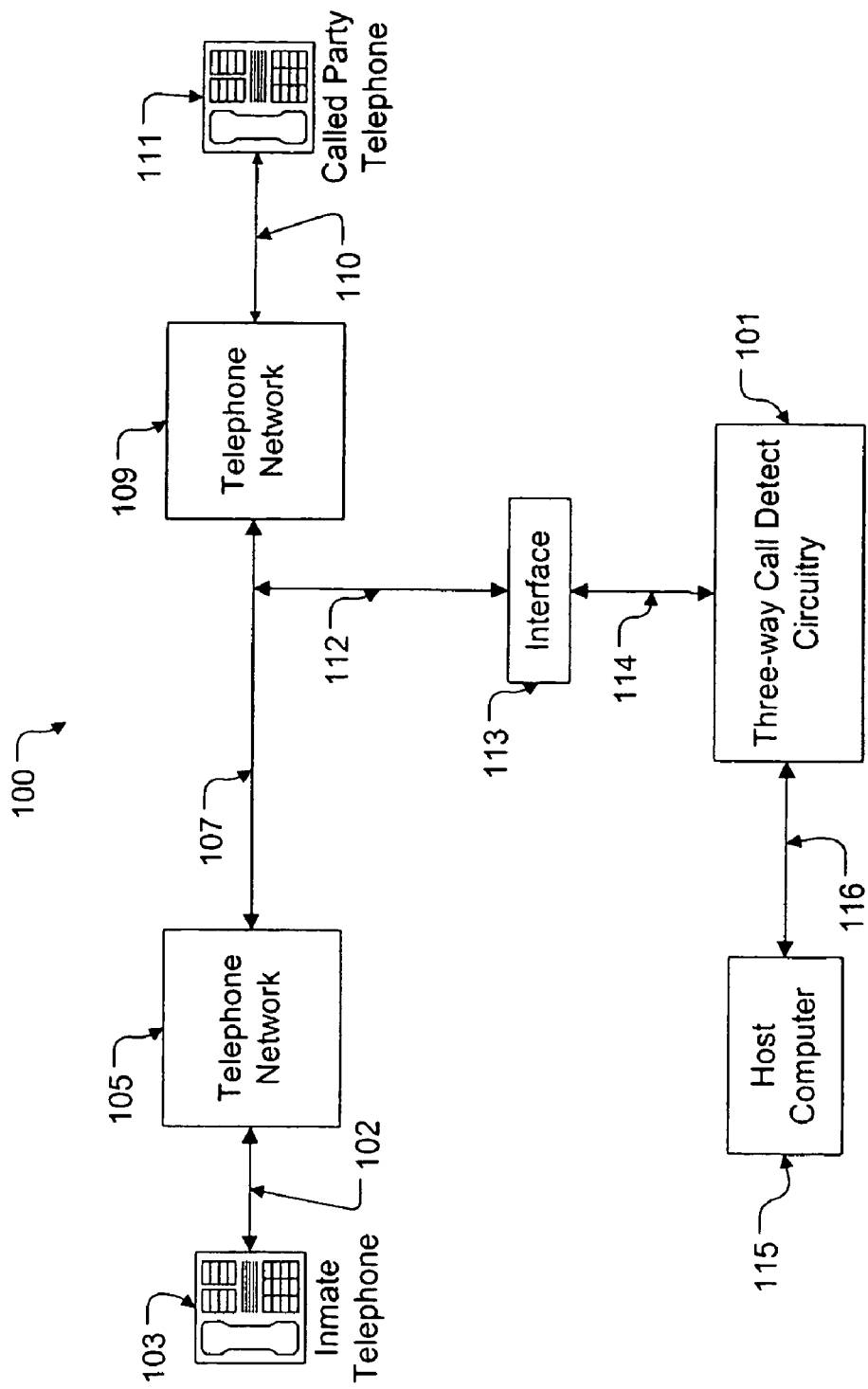
FIG. 1 shows a block diagram of the preferred configuration of the three-way call detection system according to the present invention.

Referring first to FIG. 1, depicted is three-way call detection circuit 101 of the present invention configured to monitor telephone calls between an inmate or resident (calling from inmate telephone 103) and a called party (from called party telephone 111) in telecommunications system 100. In this configuration, inmate telephone 103 connects to telephone network 105 through connection 102, and called party telephone 111 connects to telephone network 109 through connection 110. Telephone network 105 and telephone network 109 bi-directionally communicate audio data through connection 107 thus enabling an inmate or resident at inmate telephone 103 to communicate with a called party at called party telephone 111.

Three-way call detection circuit 101 monitors connection 107 through interface 113. Specifically, interface 113 receives audio signals from connection 107 through monitor connection 112. In turn, interface 113 provides the signals to three-way call detection circuit 101 through interface connection 114. Alternatively, three-way call detection circuit 101 can receive data directly from connection 107.

In an alternative configuration, three-way call detection circuit 101 can monitor connection 102 between inmate telephone 103 and telephone network 105. If, for example, inmate telephone 103 is in an institution such as a prison, nursing home, school, detention center, hospital, etc., this enables three-way call detection circuit 101 to be internal to the institution.

Three-way call detection circuit 101 (discussed in more detail below with respect to FIG. 2) monitors connection 107 (or alternatively, connection 102) for signals indicative of a three-way call attempt. Three-way call detection circuit 101 also communicates with host computer 115 via host connection 116 to inform host computer 115 if a three-way call attempt was initiated by a called party at called party telephone 111. As discussed earlier, a three-way call is typically initiated when the called party depresses the hook switch on the telephone, generating a hook-flash signal. The calling party (i.e., the inmate or resident) is temporarily disconnected from the called party while the called party establishes a connection with a third party. Then, all three parties can converse.

Three-way call detection circuit 101 is compatible with institutional telecommunications systems such as those in prisons, nursing homes, mental institutions, etc. Therefore, host computer 115 may be any computer in a telecommunications system, including a host computer in one of the institutions listed above. In these types of institutions it is important to monitor all telephone calls for the presence of three-way call attempts to prevent, among other things, inmates or residents from accessing blocked or restricted telephone numbers. If three-way call detection circuit 101 detects a signal indicative of a three-way call attempt, it communicates this to host computer 115. Host computer 115 can then use this information to take the appropriate action, which may include disconnecting the telephone call, warning the calling or the called party, monitoring the call, logging the call, flagging the call, etc.

Figure 2:
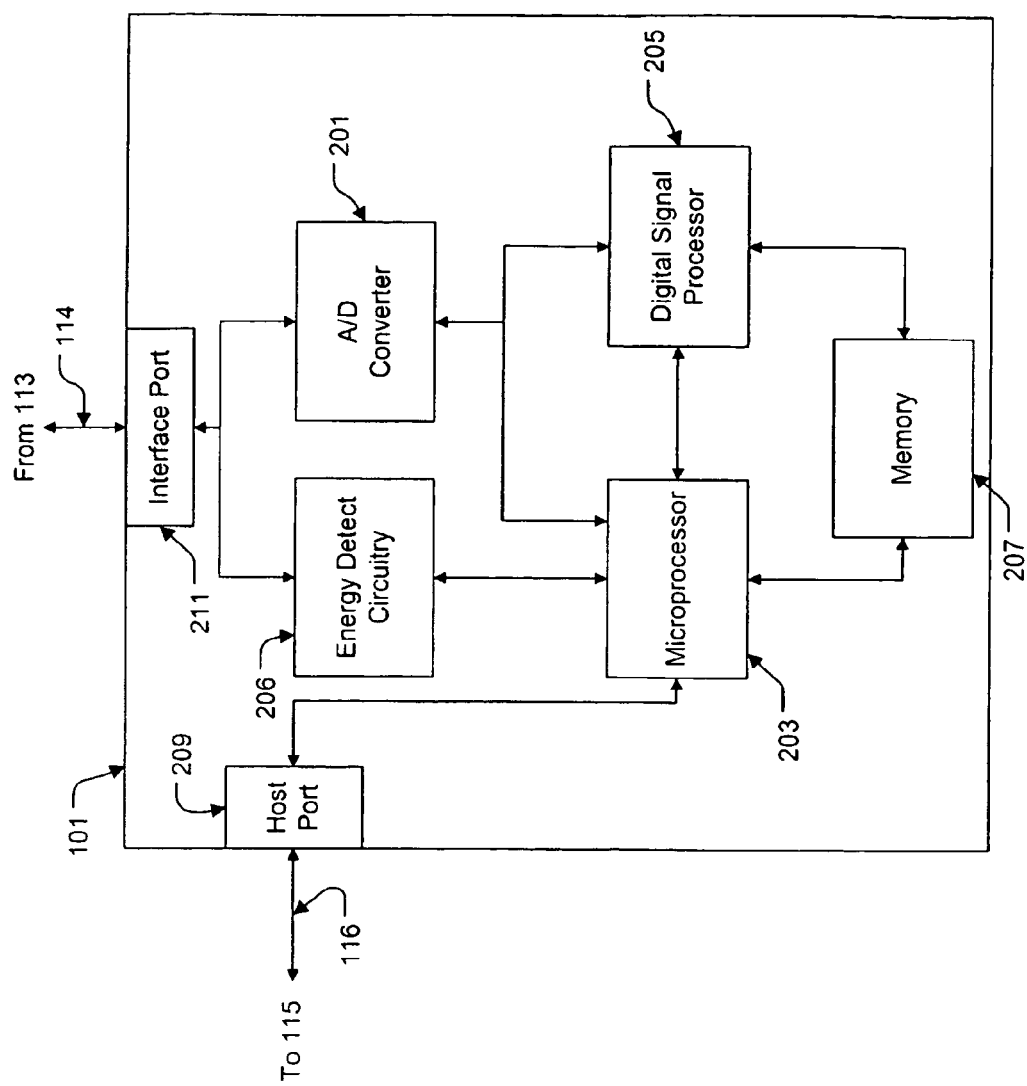
FIG. 2 depicts a schematic representation of the preferred embodiment of the three-way call detection circuit shown in FIG. 1 illustrating its ports and internal structure.

Turning next to FIG. 2, depicted is a block diagram of the preferred embodiment of three-way call detection circuit 101. As shown, three-way call detection circuit includes analog to digital (A/D) converter 201, microprocessor 203, digital signal processor 205, energy detection circuit 206, memory 207, host port 209, and interface port 211.

During operation, three-way call detection circuit 101 monitors the telephone line communication between an inmate or resident and a called party by receiving audio data from interface 113 through connection 114 (see FIG. 1). The system of the present invention is preferably compatible with both analog and digital telecommunications systems. Therefore, signals received by three-way call detection circuit 101 from interface 113 may be either analog or digital. If the signals are analog, A/D converter 201 first converts the signals to a digital format before being sent to microprocessor 203 and digital signal processor 205. If the telecommunications system is digital, a D/A converter may be used to transmit analog signals to energy detection circuit 206. Notably, three-way call detection circuit 101 is compatible with a signal represented by 8-bit signed linear data, 8-bit μ-law, 16-bit linear data, etc.

Signals from connection 114 are received at interface port 211 and transmitted to both A/D converter 201 and energy detection circuit 206. A/D converter 201 converts analog telephone line data to a digital signal compatible with microprocessor 203 and digital signal processor 205. As will be discussed with respect to FIG. 3, microprocessor 203 instructs digital signal processor 205 and energy detection circuit 206 to analyze certain portions of the signal received from the telephone connection. Microprocessor 203 uses this analysis to detect signals from the telephone line indicative of a three-way call using the algorithm to be discussed below. If a three-way call attempt is detected, microprocessor 203 informs host computer 115 by transmitting a message to host port 209. Host port 209, in turn, communicates this message through connection 116 to host computer 115.

To detect a three-way call, three-way call detection circuit 101 monitors for pulses of energy with amplitude and phase consistent with a three-way call click. Preferably, the monitoring analyzes signals from connection 107 in the time-domain and the frequency domain, where the FFT is used to convert the signal into the frequency domain. The system preferably first analyzes signals from connection 107 in the time-domain to isolate only those signals with time-domain characteristics consistent with a three-way call click. Then, the FFT is performed on signal samples isolated by this process. This avoids computing the computationally intensive FFT for all signal samples received from connection 107.

Figure 3:
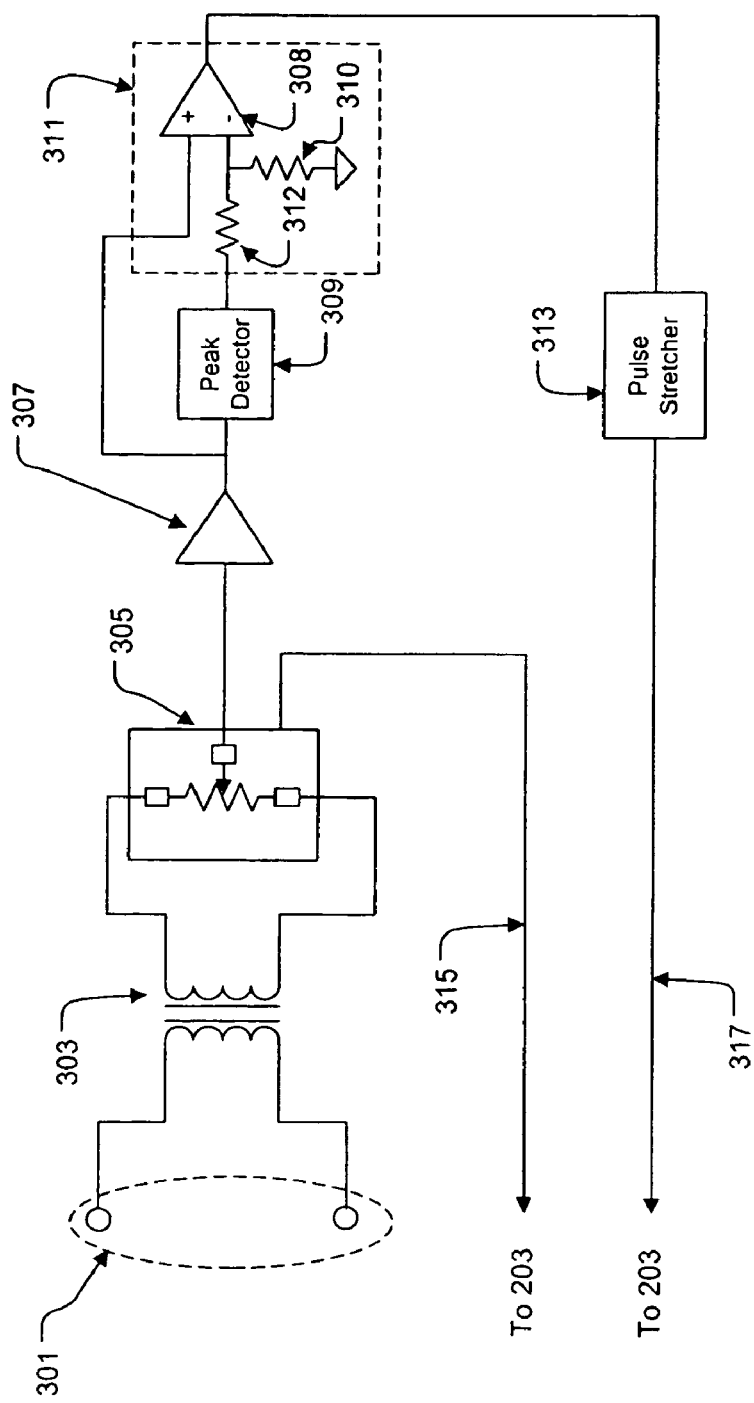
FIG. 3 is a schematic diagram of the preferred embodiment of the circuit used to detect energy pulses having amplitudes and durations characteristic of a three-way call click.

Referring next to FIG. 3 shown is a block diagram of energy detection circuit 206 used by three-way call detection circuit 101 to detect an energy pulse (steps 311 and 313). As shown, energy detection circuit 206 preferably comprises audio input 301, isolation transformer 303, sensitivity adjustment circuit 305, amplifier 307, peak detector 309, threshold detector 311, and pulse stretcher 313. Of course, other known circuits for detecting energy may be used. In the preferred embodiment, isolation transformer 303 is used to isolate energy detection circuit 206 from the circuit of the inmate's or resident's telephone handset while transferring the handset signals from audio input 301 to energy detection circuit 206. This transferred signal is then adjusted by sensitivity adjustment circuit 305 under control of microprocessor 203 via sensitivity adjustment line 315. The conditioned signal is then amplified by amplifier 307.

Peak detector 309 isolates energy pulses in the filtered signal that exceed a predetermined magnitude. In the preferred embodiment, the predetermined magnitude is approximately 6 Decibels (dBs), although other magnitudes may be chosen in accordance with the invention. When such a pulse is detected, the output of peak detector 309 is driven high and a signal is sent to threshold detector 311, which is comprised of operational amplifier 308, and resistors 310 and 312. Preferably resistors 310 and 312 are both 10 kΩ resistors. If a pulse is provided to threshold detector 311, it passes the signal to pulse stretcher 313. If no pulse is detected, threshold detector 311 does not output the received signal.

Preferably, pulse stretcher 313 is used to maintain the output of threshold detector 311 at its high level for 20 milliseconds. However, pulse stretcher 313 may be configured to maintain the output of threshold detector 311 for any time period. The stretched signal is then output on energy detect line 317 and analyzed by microprocessor 203 to determine if an energy pulse consistent with a three-way call click has been found (i.e., if the pulse has a magnitude of approximately 6 dBs or greater).

Figure 4:
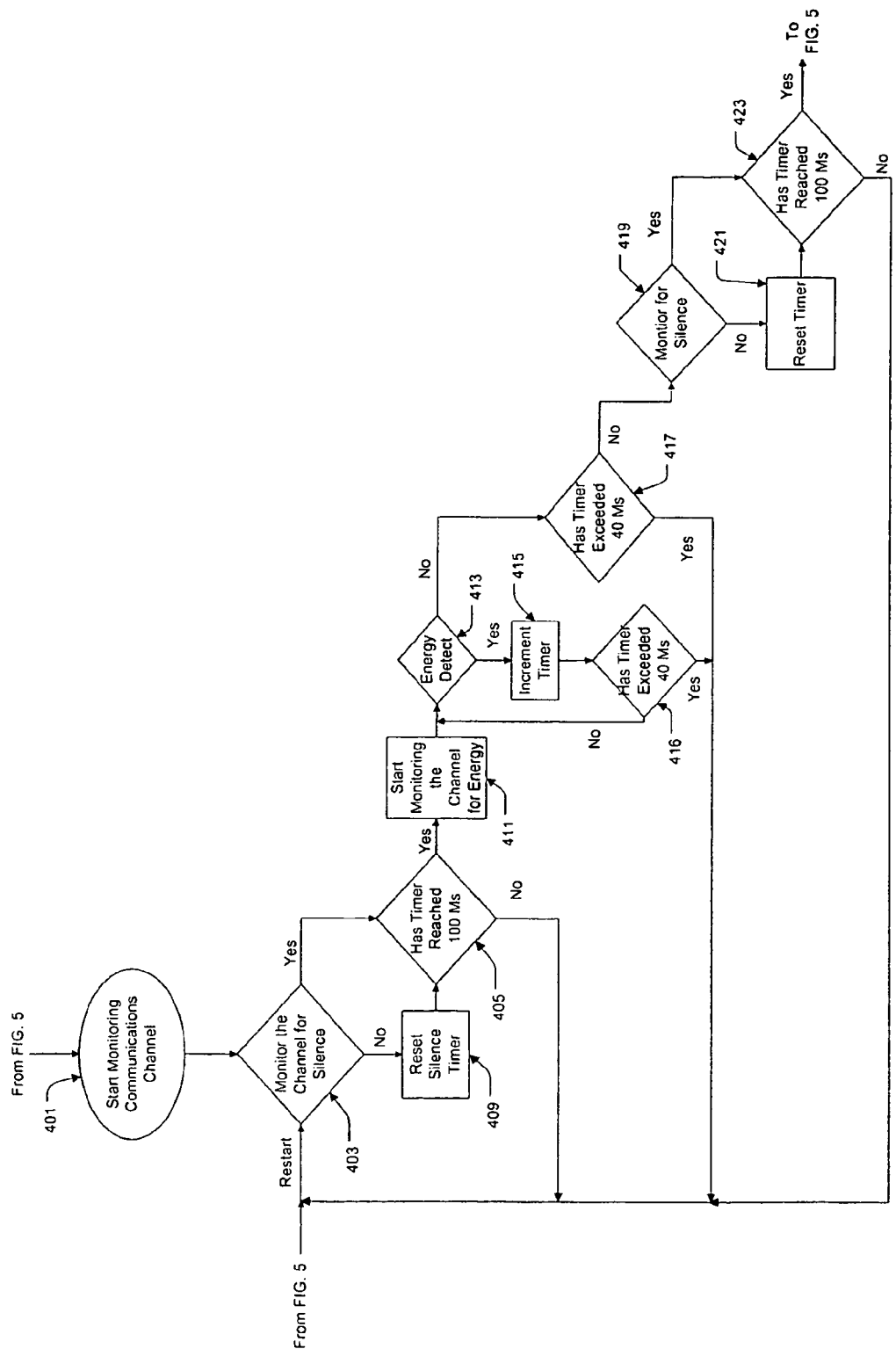
FIG. 4 depicts a flow chart of a preferred process implemented by the present invention to detect pulses on a telephone line with time domain characteristics consistent with a three-way call click.

Referring next to FIG. 4, shown is a flow chart of the method to isolate portions of the signal with time-domain characteristics indicative of a three-way call click. The method is preferably implemented by microprocessor 203 in conjunction with digital signal processor 205 and/or energy detection circuit 206. The process begins with initialization step 401. The three-way call detect system of the present invention is capable of monitoring all lines of telecommunications in a system. During initialization step 401, the method begins to receive signals from each of these telephone lines. Herein, the remainder of the discussion focuses on the method for monitoring one telephone line. However, the same method can be implemented to monitor all lines of communication simultaneously.

According to the preferred embodiment of the invention, a pulse has time-domain characteristics consistent with a three-way call click if it is a pulse of energy less than approximately 40 ms in duration and if it is preceded and followed by a period of silence (POS), where each POS is at least approximately 100 ms in duration. Thus, after initialization step 401, the process monitors the telephone line for a first POS (step 403). According to the present invention, silence is a period of time during which the signal does not exceed a predefined amplitude. A pulse of energy is a period of time during which the signal does not drop below a predefined amplitude.

Preferably a timer is used to measure how long the signal remains silent. Step 403 begins by setting this timer to zero and then receiving a signal from connection 107 for a pre-defined sample length. If the sample signal comprises silence, the system increments the timer by the sample-length and checks to see if the time has exceeded 100 ms (step 405). If it has not, connection 107 is monitored for another sample-length of signal (step 403). This process continues until either (1) the line has been silent for longer than 100 ms, or (2) the silence is broken. If the silence is broken, a check is made that the timer did not exceed 100 ms and the timer is reset (step 409). If connection 107 was not silent for 100 ms or longer, the signal does not contain a POS indicative of a three-way call click, and the process returns to step 403.

If however, the timer has reached or exceeded 100 ms, then a POS has been detected. The system next monitors for a pulse of energy with a duration of less than or equal to approximately 40 ms (step 411). In step 411, an energy timer is set to zero. Once energy is detected in step 413, the timer is incremented (step 415). Next, a check is made to see if the timer has exceeded 40 ms (step 416). If the timer has exceeded 40 ms, the system determines that the pulse of energy is not indicative of a three-way call attempt and resets all timers and again returns to step 403, where telephone line 107 is monitored for a new POS.

If energy is no longer detected in step 313, the system checks if the duration of the energy pulse was for 40 ms or less (step 417). If the pulse exceeds 40 ms in duration, the system resets all timers and again returns to step 403. If the pulse is less than 40 ms, the system next monitors for another POS following the pulse of energy (step 419). The process for monitoring for a second POS preferably mirrors the process used to monitor for the first POS. Specifically, the system monitors for silence (step 419) until the timer reaches 100 ms (step 423) or until silence is broken. If silence is broken, the timer is reset (step 421). If silence is broken before the timer reaches 100 ms, then the system determines that the signal is not indicative of a three-way call attempt and the process returns to step 403. If, as determined in step 423, the energy pulse is followed by a POS greater than or equal to 100 ms, then the system saves the signal representing the pulse for further analysis. Specifically, as will be discussed with respect to FIG. 5, the process next isolates the pulse to analyze its components.

Figure 5:
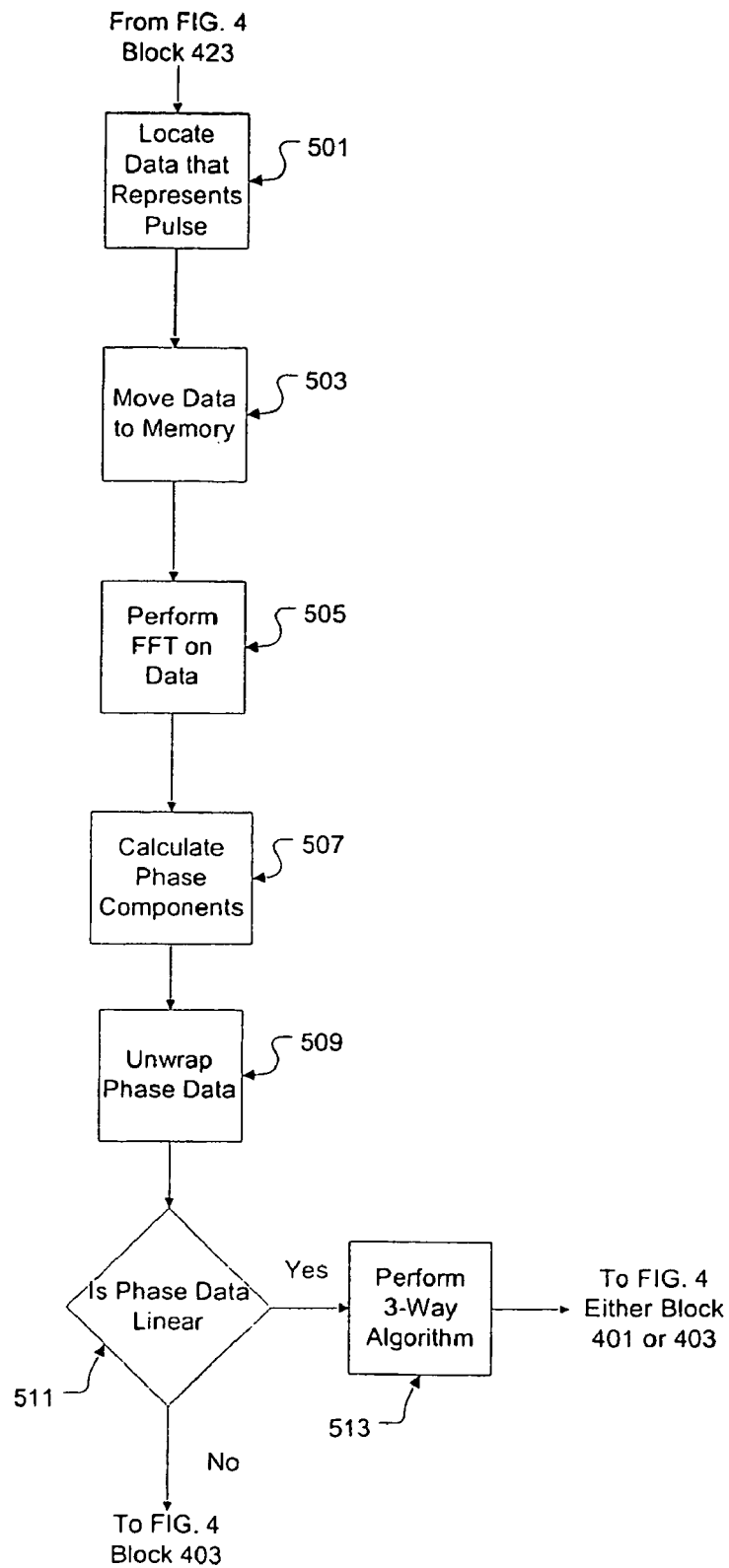
FIG. 5 depicts a flow chart of a preferred process implemented by the present invention to calculate and analyze the phases of the frequency components that comprise a pulse.

As demonstrated in FIG. 5, if a pulse is found with time domain characteristics consistent with a three-way telephone call, it is next analyzed in the frequency domain to determine if the phase delays of the frequency components that comprise the pulse are approximately the same. If a sample signal is isolated by the process illustrated in FIG. 3 (i.e., it has time-domain characteristics consistent with a three-way call click), then the process, shown in FIG. 5, first locates data that represents the pulse (step 501). Next, that data is moved to memory 207 (step 503). Then, the FFT of the data is calculated and the result is stored in memory 207 (step 505).

Preferably, the signal being analyzed is 8 KHz pulse code modulation (PCM) data. However, the system is compatible with any type of data, including signed linear data, 8-bit μ-law data, 16-bit linear data, analog data, etc. As discussed above, if three-way call detection circuit 101 is used to monitor analog connections, A/D converter 201 converts the signal to a digital format compatible with digital signal processor 205.

For purposes of discussion, it will be assumed that 8 KHz PCM data is used. The FFT is set to compute 512 samples thus resulting in each sample representing a range of 15.625 Hz. There are many known software and hardware modules for computing the FFT of a digital signal. For example, computer programming code for computing the FFT is available from the Massachusetts Institute of Technology (MIT) or from other known sources, such as the Internet. In the preferred embodiment, the FFT is calculated by digital signal processor 205, although microprocessor 203, a general purpose CPU, a software module, etc., may also be used.

The results of the FFT are stored in memory 207. For a discrete (i.e., digital) signal, x[t], with N samples, the resulting output is $X[w_k]$, where $X[w_k]$ is defined as:

$$X[w_k] = \sum_{n=0}^{N-1} x[t_n] e^{-jw_k^t n}, k = 0, 1, 2, \ldots, N-1 \quad (8)$$

In equation 8, $x[t_n]$ is the signal in the time domain, $t_n$ is the $n_{th}$ sampling instant, $W_k$ is the $k_{th}$ frequency sample (i.e., the $k_{th}$ frequency component), and $X[w_k]$ is the FFT of the signal. The FFT computes a complex coefficient for each component that comprises the signal. As discussed earlier, this complex coefficient can be used to calculate a magnitude and a phase for the component.

In step 507, the phase for each component that comprises the signal, regardless of its magnitude, is calculated and stored in memory 207. The phase is the arctangent of the imaginary component of the complex coefficient divided by the real component of the complex coefficient:

$$\text{Phase} = a \tan(\text{Imaginary}/\text{Real}) \quad (9)$$

Therefore, a cosine wave corresponds to a wave with 0 degrees phase (0 radians) and a sine wave corresponds to a wave with 90 degrees phase ($\pi/2$ radians). The range of possible phase values extends from −180 degrees (−$\pi$ radians) to 180 degrees ($\pi$ radians).

Figure 6:
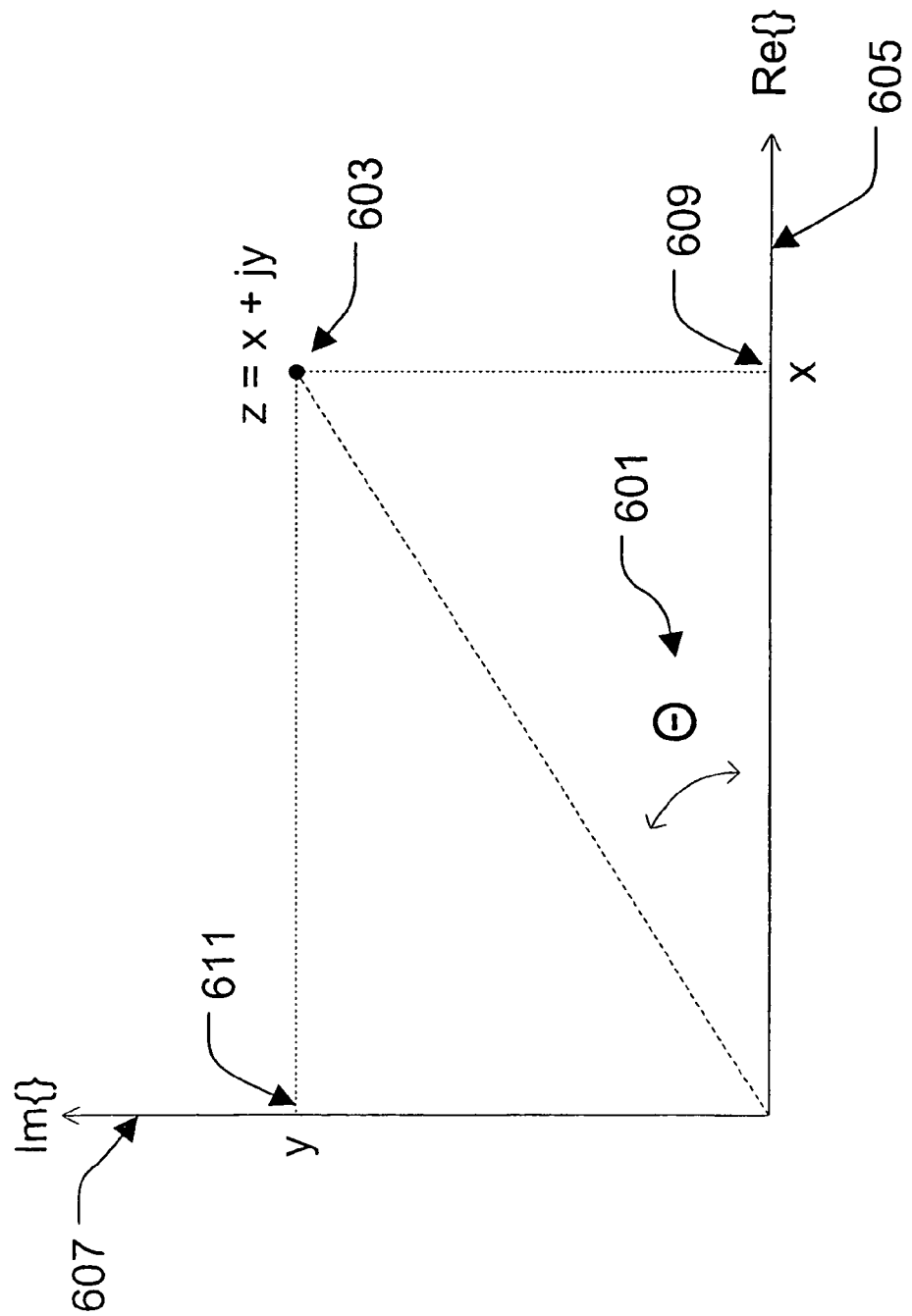
FIG. 6 depicts a graphical representation of how the output of the FFT is used to calculate a phase for each component of a pulse.

FIG. 6 shows a graphical representation of how the phase, angle $\Theta$ 601, is calculated for a component with coefficient z 603. As can be seen, z is plotted on the complex plane with real axis 605 and imaginary axis 607. In this example, z 603 has real component x 609 and imaginary component y 611, and thus is equal to x+jy. Using basic geometry and trigonometry, it is clear that the phase of angle Θ 601 is the inverse tangent of the imaginary component y 611 divided by the relay component x 609:

$$\Theta = \arctan(y/x) \quad (10).$$

Thus, using this calculation, the phase for each component can be calculated. The resulting calculated phases are stored in memory 207.

Returning to FIG. 5, once the phases for each component of the pulse are computed, the phase data is analyzed to determine if the sample includes a click indicative of a three-way call attempt. First, the phases are unwrapped (step 509). As discussed earlier, the FFT calculates amplitude and a phase for each component that comprises the pulse. However, because of the sinusoidal nature of the output of the FFT, the calculated phase ranges only from $-\pi$ to $\pi$. If the real phase extends beyond this range, large jumps in phase may appear to exist between components because the calculated phase "wraps around" the $-\pi$ to $\pi$ range. Therefore, phase unwrapping operates to correct these phase jumping artifacts by adding multiples of $+/-2\pi$ when absolute jumps between consecutive phases are greater than a predefined tolerance (e.g., $\pi$). The resulting unwrapped phase is devoid of the artificial jumps in phase and is stored in memory 207. Notably, more complex phase unwrapping techniques are also known, any of which are compatible with three-way call detection circuit 101.

Next, the characteristics of the unwrapped phase are analyzed for linearity (step 511). As discussed earlier, phase is in a unit of radians. However, the system of the present invention is used to locate pulses of energy where each pulse has the same phase delay, which is in unit time. For a component having frequency ω, phase delay, P(ω), is defined as:

$$P(\omega) = \Theta(\omega)/\omega, \quad (11)$$

where ω is the frequency, and Θ(ω) is the phase, or unwrapped phase.

According to the system of the present invention, if the phase delay of each component that comprises a pulse is the same, then the pulse is indicative of a three-way call click. A click is generated by the central office and is composed of many frequency components. Because it is a "machine generated" pulse, all of the components are generated at the same time and should therefore have a common phase delay.

As an alternative to computing the phase delay for each component, the system can analyze the phases, or unwrapped phases for linearity. If the phase is linear with respect to frequency (i.e., Θ(ω)=α(ω), where α is a constant), then through simple mathematical substitution, it is evident that the phase delay will be the same (α), independent of ω. For example, $$P(\omega) = \alpha*\omega/\omega \quad (12)$$

$$P(\omega) = \alpha \quad (13)$$

In the art of signal analysis, a group delay, G(ω), is defined as the derivative of the phase and can be used to compute the linearity of the phase as a function of frequency. Group delay, G(ω), is defined as:

$$G(\omega) = -d/d\omega(\Theta(\omega)). \quad (14)$$

If the group delay, G(ω), is a constant (i.e., Θ(ω) is linear), then the group delay, G(ω), equals the phase delay (i.e., it is α). Thus, preferably, step 511 entails analyzing the group delay of the unwrapped phases of the components that comprise the pulse. If the group delay, G(ω), is a constant, the pulse has frequency components with a common phase delay and thus is indicative of a three-way call click. Three-way call detection circuit 101 communicates this to host computer 115, where appropriate action can be taken (step 513). Such action, as discussed above, might include monitoring the telephone call, providing a prompt that warns the called party and/or calling party, recording the telephone call, blocking the telephone call, blocking all future telephone calls to that telephone number, flagging the call, etc. If the system disconnects the telephone call in step 513, then the process returns to initialization step 301 (see FIG. 3) where the system begins monitoring any new telephone calls. Alternatively, if the three-way call algorithm allows the telephone call to proceed, then the process resets all timers and returns to step 303 where the same call is monitored for subsequent three-way call attempts.

According to the present invention, the system may also use other techniques to verify that the pulse being analyzed is characteristic of a three-way call click. These techniques further decrease the possibility of a false-positive (i.e., the system incorrectly identifying a pulse as a three-way call click) by filtering out samples with characteristics not indicative of a click.

Figure 7:
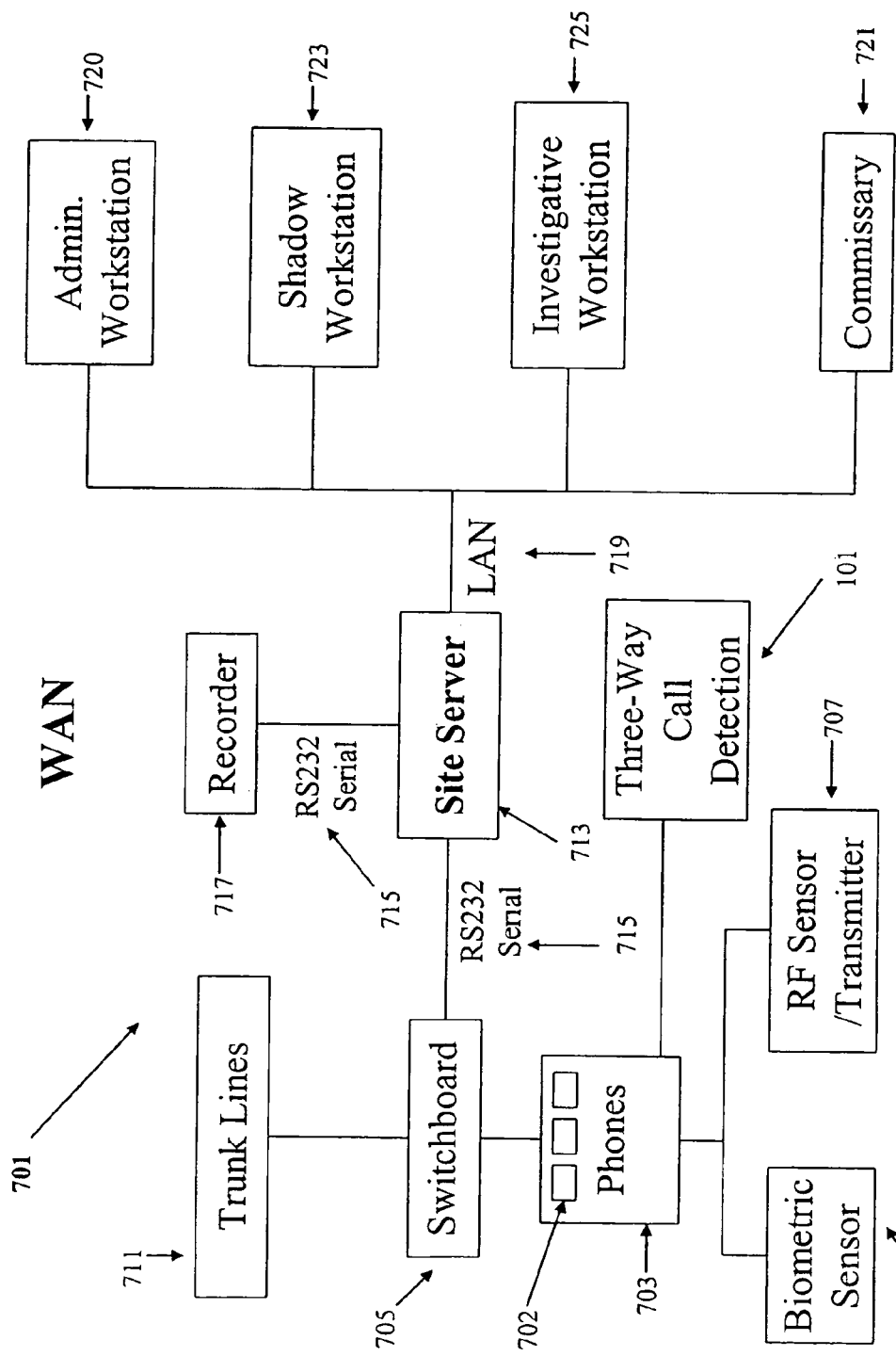
FIG. 7 shows a block diagram of an alternate configuration of the three-way call detection system of the present invention.

Referring lastly to FIG. 7, shown is an alternate configuration of the three-way call detection circuit 101 as used in an institution telephone management system 701. A plurality of user telephones 702, wherein the actual number of telephones depends on the desired capacity of the institution call system, are incorporated into a telephone bank 703 and are connected to an electronic switchboard device 705. It is preferred that telephone bank 703 may be centrally located within a facility to allow for centralized monitoring. However, it is foreseeable that telephone bank 703 may be located at a multitude of locations internal or external to a facility to allow for efficient monitoring. Each user telephone 702 may be equipped with biometric sensing device 709, such as a retinal scanner, fingerprint reader, etc., or any combination of biometric devices, so that the acquired biometric data can be used for user authentication. Alternatively, for efficiency, a single biometric sensing device 109 may be employed for a multitude of user telephones 102. Additionally, each telephone may incorporate RF receiver 707 and RF transmitter 708 to provide RF signals for authentication purposes. In this scenario, it is foreseeable that each user is be required to wear an RF transmitter 708 device to transmit radio waves to the RF receiver 707. RF receiver 707 may be integral to telephone bank 703 or remote to telephone bank 703. Each RF transmitter 708 may be uniquely encoded to a specific authorized user. The encoded signal for RF transmitter 708 may be altered on an intermittent basis depending on the security desired at the institution. RF transmitter 708 may be incorporated into a wristband, ankle band, or any other like device. It is foreseeable that RF transmitter 708 may be semi-permanently or permanently attached to a user's person in any manner.

Electronic switchboard device 705 regulates calls and connects them to the proper outgoing trunk line 711. Trunk line 711 may consist of a multitude of connections to any number of local, long distance, or international telephone service providers. The number of trunk lines 711 depends on the outgoing capacity desired by the institution. In addition, trunk lines 711 may be analog, digital, or any other type of trunk lines not yet contemplated. Electronic switchboard device 705 further incorporates an integrated channel bank, allowing calls to be processed over either analog or digital trunks as required by the telephone call system 701. Specifically, when one trunk line 711 is occupied and handling an outgoing communication, electronic switchboard device 705 automatically accesses an alternate trunk line 711 to handle the outgoing communication. If all trunk lines 711 on the system are in use, the call may be routed to an alternate system (not depicted). For example, electronic switchboard device 705 may be interconnected to a multitude of switchboards to allow for expansion of the system to meet the capacity desired by the institution. A cross point switch integrated into electronic switchboard device 705 may also accomplish this routing.

Multiple processors may also be incorporated into the architecture. This allows call processing even after parallel component failure. The architecture also provides for a sharing of the load between processors, which eliminates system overload during extremely busy periods. The multiple processors enable the system to handle large volumes of calls at any time, and ensure system integration.

Additionally, electronic switchboard device 705 performs the voice prompts heard by the calling party and the recipient of the call allowing the parties to respond to the menu selections. Electronic switchboard device 705 tests outgoing trunk lines as calls are placed and digitizes telephone audio for recording and/or biometric voice identification purposes. If no dial tone is present, one of trunk lines 711 may be taken out of service for a pre-programmed amount of time for maintenance. These capabilities are pre-programmed into the device's firmware. However, it is foreseeable that software and software upgrades may provide these services in addition to other services useful in the present invention.

A central site server 713 interfaces within the telephone call system 701 via a first serial port 715. In the preferred embodiment of the present invention, an RS-232 serial port is employed for the interference connection. However, it is foreseeable that other types of serial ports 715 commonly known in the art may be utilized. Serial port 715 may also be comprised of a direct hardware connection or may consist of a series of ports and connecting means commonly known in the art for connecting electronic devices. Serial port 715 is designed to allow firmware driven systems, such as electronic switchboard device 705, to interface with software-based systems, such as a PC designed system operating as a site server. All inmate and call information is routed through central site server 713. At central site server 713, user call information is digitized for efficient data transfer and efficient record keeping. Central site server 713 stores at least each user's financial transaction data. It is preferred that central site server 713 also stores the digitized audio used for voice prompts as well as each user's call restrictions, PIN, biometric verification data, etc. However, depending on the memory requirements, numerous site servers may be employed. It is foreseeable that older archived data may also be stored on an integral or a remote computer system database (not shown) or kept on additional storage devices on the central site server 713.

Three-way call detection circuit 101 is utilized each time a telephone call is placed utilizing telephone call system 701. Three-way call detection circuit 101 is connected to telephone bank 703 and constantly monitors all active trunk lines 711 and telephone conversations. During a telephone call, three-way call detection circuit 101 monitors the connection and looks for pulses with phase characteristics indicative of a three-way call, as discussed above. If such a pulse is found, then a three-way event (TWE) is set and three-way call detection circuit 101 executes the appropriate response. For example, the TWE may direct telephone call system 701 to disconnect the telephone call, flag the telephone call, record the telephone call, monitor the telephone call, etc.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method, comprising:
monitoring an audio signal on a telephone line with a detector for a first period of silence, an energy pulse, and a second period of silence wherein the second period of silence follows the detection of the energy pulse;
processing the energy pulse wherein the energy pulse includes a plurality of frequency components;
determining a duration of the energy pulse on the telephone line;
calculating a phase for each of the plurality of frequency components to generate a plurality of phase values;
generating an alert signal when the plurality of phase values are linear and when the duration of the energy pulse is less than 40 milliseconds, wherein a three-way call attempt on the telephone line is identified by the alert signal; and
transmitting the alert signal to a host computer to identify the three-way call attempt on the telephone line.

2. The method of claim 1, further comprising:
calculating a Fast Fourier Transform of the energy pulse to produce a complex coefficient for each of the plurality of frequency components.

3. The method of claim 1, further comprising:
calculating a phase delay for each of the plurality of frequency components.

4. The method of claim 1, further comprising:
calculating an unwrapped phase for each of the plurality of frequency components.

5. The method of claim 1, further comprising:
calculating a group delay for each of the plurality of frequency components.

6. The method of claim 1, wherein the duration of the energy pulse is approximately 40 milliseconds.

7. The method of claim 1, further comprising:
monitoring the telephone line to detect the first period of silence, wherein the first period of silence has a duration lasting at least approximately 100 milliseconds.

8. The method of claim 1, further comprising:
monitoring the telephone line to detect the second period of silence, wherein the second period of silence has a duration lasting at least approximately 100 milliseconds.

9. The method of claim 1, wherein the first period of silence precedes the detecting of the energy pulse.

10. The method of claim 1, wherein the energy pulse exceeds a predetermined amplitude.

11. The method of claim 1, wherein an amplitude of the energy pulse has a value that exceeds a normalized silence audio level.

12. The method of claim 1, further comprising:
monitoring a telephone call on the telephone line for the three-way call attempt.

13. The method of claim 1, further comprising:

providing a prompt on the telephone line to warn a called party or a calling party that the three-way call attempt is detected.

14. The method of claim 1, further comprising:

recording a telephone call on the telephone line when the three-way call attempt is detected.

15. The method of claim 1, further comprising:

blocking a telephone call on the telephone line when the three-way call attempt is detected.

16. The method of claim 1, further comprising:

blocking a future call to a telephone number associated with a called party via the telephone line when the three-way call attempt is detected.

17. The method of claim 1, further comprising:

flagging a telephone call on the telephone line when the three-way call attempt is detected.

18. The method of claim 1, further comprising:

disconnecting a telephone call on the telephone line when the three-way call attempt is detected.

* * * * *